Patented Nov. 3, 1970
3,537,511
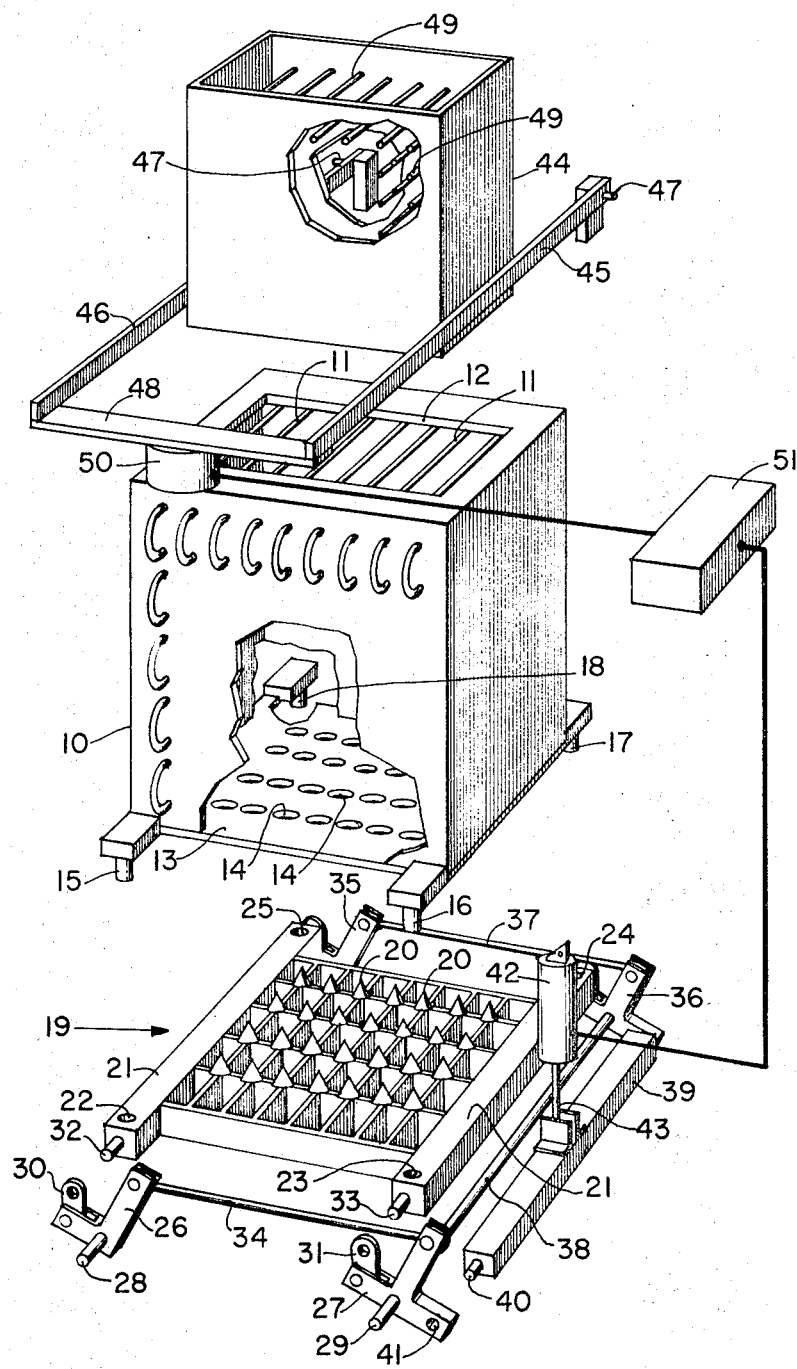
INVENTORS
Gustav A. Maag
Donald L. Gerth
BY
*Fredrick H. Braun*
ATTORNEY

United States Patent

[11] 3,537,511

[72] Inventors Gustav A. Maag
Crestview Hills, Ky., and;
Donald L. Gerth, Springfield Township,
Hamilton County, Ohio
[21] Appl. No. 797,060
[22] Filed Feb. 6, 1969
[45] Patented Nov. 3, 1970
[73] Assignee The Proctor & Gamble Company
Cincinnati, Ohio
a corporation of Ohio

[54] CONTROLLING FLOW IN GRANULES HEAT EXCHANGER
8 Claims, 1 Drawing Fig.
[52] U.S. Cl. ........................................... 165/32,
165/39, 165/117, 34/177, 222/58, 222/146
[51] Int. Cl. ........................................... G05d 23/00
[50] Field of Search ........................................ 165/32, 39,
117, 158; 34/177; 222/58, 146

[56] References Cited
UNITED STATES PATENTS
3,031,773 5/1962 Dunkle ........................ 34/177
3,068,076 12/1962 Sackett ........................ 222/58
3,319,828 5/1967 Maxwell ........................ 222/58

*Primary Examiner*—Charles Sukalo
*Attorneys*—Fredrick H. Braun and John V. Gorman ABSTRACT: A weigh duct is mounted for pivotal movement over the inlet to a tubular heat exchanger designed for heating or cooling granular material. Flow of granules from the bottom outlet of the heat exchanger is regulated by a metering device mounted in the lowermost portion thereof which can be adjusted to control flow through the heat exchanger. The weight of granules in the weigh duct is continuously sensed by a weigh cell which transmits a proportional signal to a set point controller. The set point controller continuously sends a signal for properly positioning a control cylinder which is used to vary outflow from the heat exchanger through the metering device. Outflow is adjusted and controlled in order to maintain an optimum choked flow condition within the heat exchanger.

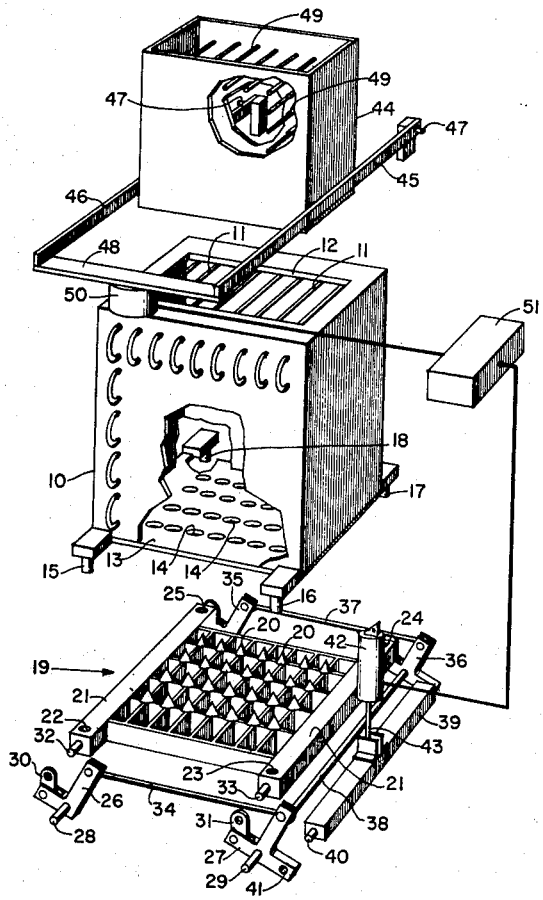

CONTROLLING FLOW IN GRANULES HEAT EXCHANGER

BACKGROUND OF THE INVENTION

It has been found that products in granular form such as detergent granules, sugar and the like, can be cooled or heated very effectively by merely passing the granules through a heat exchanger containing a plurality of cooling tubes mounted transversely across a heat exchange chamber such that the granules flow over the outside tube surfaces. The secret of effective heat transfer in these circumstances is to maintain the heat exchange chamber completely full of granules rather than let them fall freely through the chamber. This results in maximum contact of the granules as a function of time with respect to the heat exchange surfaces. The effect is known in the art as a "choked flow" condition.

When cooling large quantities of granules, it is oftentimes very difficult to maintain a constant choked flow condition. While the prior art was aware of the advantages of choked flow heat exchange for granular products, there was no suggestion of a device that would effectively maintain this condition for very large volumes of granules and particularly when the rate of flow was varied considerably with respect to time. As a consequence, one of the basic drawbacks with previously known granular heat exchangers was the lack of an effective device for continuously maintaining the condition known as choked flow.

SUMMARY OF THE INVENTION

The nature and substance of the invention will be most readily appreciated by first giving consideration to a number of its primary objects.

A major object of the invention is the provision of a device for controlling flow in a heat exchanger for granular material in order to maintain a choked flow condition in the heat exchanger at all times for the purpose of obtaining the most efficient and effective heat exchange possible under a given set of conditions.

Another object of the invention is the provision of a system of this character in which the proper level for choked flow may be maintained in the heat exchanger even with very high rates of granules flow therethrough. That is, it is an an objective to obtain a device that is effective with product turnover in the heat exchanger occurring as frequently as once or twice per minute.

A further object of the invention is the provision of a device having means to accomplish uniform plug flow of granular material through tubular heat exchangers of large cross section.

These and other objects are obtained by the provision of a weigh duct mounted for pivotal movement above a heat exchanger and located such that all of the granular project flows through the weigh duct prior to flowing into the heat exchanger. The weigh duct contains a plurality of weight support members which are designed to support the weight of granular material therein at any given time. The weight of granules in the weigh duct is detected by an appropriate weight sensing device which transmits a signal proportional to the weight sensed to a set point controller. A flow metering device is located at the bottom of the heat exchanger and is capable of constant adjustment in order to control outflow therefrom. The flow metering device is automatically adjusted in response to the signal continuously transmitted by the set point controller in response to the signal it receives from the weigh cell such that the heat exchanger is maintained in choked condition under all conditions of flow.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing which illustrates a flow control device as applied to a tubular heat exchanger, the drawing being an exploded view with portions thereof fragmented in order to facilitate the illustration thereof.

DESCRIPTION OF THE PREFERRED EMBODIMENT

The invention will now be described as applied to a tubular heat exchanger designed for the cooling of granular products, e.g., detergent granules or the like. The heat exchanger 10 is composed of a plurality of side walls there being a plurality of tubes 11 running transversely from side-to-side on the inside of the heat exchanger 10. The ends of the tubes 11 are connected, respectively, to a suitable inlet and outlet (not shown) of a liquid coolant such as water. The coolant is preferably continuously circulated through the tubes 11 in order to obtain the desired degree of heat exchange as the granular product flows downwardly through the heat exchanger 10 from the opening 12. The heat exchanger 10 itself can take any of various forms as will be appreciated by persons skilled in the art and the tubes 11 can be smooth or finned, the latter being of the type described in U.S. Pat. No. 3,372,742 issued Mar. 12, 1968 to James N. Forner and entitled APPARATUS FOR HEAT EXCHANGE OR GRANULAR SOLIDS. The above cited patent is assigned to and commonly owned by the assignee of the present application.

The lower portion of the heat exchanger 10 is provided with a metering plate 13 which contains a plurality of apertures 14, the latter being relatively evenly distributed across the surface of the plate 13. Guide rods 15, 16, 17 and 18 are rigidly mounted in proximity to the lower corners of the heat exchanger 10 and project downwardly as shown on the drawing.

A flow control device is mounted beneath the metering plate 13 for the purpose of controlling outflow of granules from the apertures 14. The flow control device comprises an open grid structure 19 having a plurality of upwardly projecting cone shaped protuberances 20 in corresponding underlying relation to each of the apertures 14. The grid structure 19 is supported by the members 21 on opposite sides thereof. The side members 21 contain openings 22, 23, 24 and 25 which are normally engaged on the guide rods 15, 16, 17 and 18, respectively, for sliding movement thereon. Thus it will be apparent that the relative vertical position of the cone shaped members 20 which controls outflow through the apertures 14 will be dependent upon the position of the grid device 19 with respect to the metering plate 13 as the grid structure 19 is positioned on the guide rods 15, 16, 17 and 18. As the grid structure 19 is moved upwardly, the cone shaped members 20 will enter the respective aperture 14 to restrict outflow and vice versa.

A suitable mechanism is provided for positioning the grid structure 19 on the rods 15, 16, 17 and 18. The mechanism comprises an L-shaped rocker arm 26 and a T-shaped rocker arm 27 journaled on the stud shafts 28 and 29, respectively. The stud shafts 28 and 29 are each journaled in a conventional bearing (not shown), the latter being supported on the same stationary support which may also be used for supporting the heat exchanger 10. The link members 30 and 31 are attached for pivotal movement, respectively, on the pins 32 and 33 projecting laterally from the side members 21. The lower ends of each of the link members 30 and 31 are journaled on the rocker arms 26 and 27, respectively. The rocker arms 26 and 27 are linked for movement in unison by the extended link member 34.

An essentially similar linkage mechanism is provided on the far side of the grid structure 19. The L-shaped rocker arm 35, the T-shaped rocker arm 36 and the extended link member 37 are shown in the drawing. It will be understood that the remainder of the associated linkage mechanism is identical to the linkages illustrated on the front side in order that identical motions will be imparted to both sides of the grid structure 19 as will be appreciated by those skilled in the art. A common pivot shaft 38 interconnects the T-shaped rocker arms 27 and 36. The pivot shaft 38 is coaxial with the stud shaft 29 in order that the same motion is imparted to each of the linkage arrangements on opposite sides of the grid structure 19. An actuating member 39 having a projecting pin 40 extending into the opening 41 is provided there being a similar connection between the member 39 and the T-shaped rocker arm 36.

A positioning cylinder 42 is mounted on a stationary support and has a piston rod 43 connected to the actuating member 39. Thus it will be appreciated that vertical movement by the rod 43 will be transmitted to the rocker arms 26, 27 and 35, 36 by means of the aforesaid mechanism in order to cause upward and/or downward movement of the grid structure 19. The movement of the grid structure 19 in turn controls outflow from the heat exchanger 10.

Movement of the grid structure 19 is controlled by a mechanism now to be described. A weigh duct 44 is mounted for pivotal movement over the opening 12 such that the lower end of the side walls of the weigh duct 44 fit freely within the opening 12. This permits free pivotal movement of the weigh duct 44 while suspended within the opening 12. The clearance between the lower edge of the weigh duct 44 and the opening 12 is sufficiently small and the inherent angle of repose of the material in the heat exchanger 10 is sufficiently large that there is no leakage of material through this clearance space. It is possible, if desired, to provide a suitable flexible seal (not shown) that will not interfere with pivotal movement of the weigh duct 44.

The weigh duct 44 is supported between the arms 45 and 46 which are journaled at one end on the pins 47. A cross member 48 interconnects the arms 45 and 46 at their forward ends. Suitable stationary bearings (not shown) are provided for receiving the pins 47 so that pivotal movement of the weigh duct 44 is possible thereon in response to weight variations within the weigh duct 44. As illustrated, the weigh duct 44 is preferably pivoted on a horizontal axis located laterally beyond the side walls of the weigh duct.

A plurality of transverse bars 49 are provided within the weigh duct 44. The bars 49 are substantially evenly distributed and function as weight supporting members as the level of granular material builds up in the weigh duct 44 after filling the heat exchanger 10. While the weigh duct 44 is illustrated with the transverse bars 49 therein, it will be understood that the invention can be carried out with equal facility by replacing the bars 49 with tubes or any other weight supporting members such as discs, cones, spheres, rods, etc. as will be appreciated by those skilled in the art.

Means are provided for sensing the weight of material supported by the bars 49 in the weigh duct 44 in order to control outflow from the bottom of the heat exchanger 10. The means illustrated comprise a stationary weigh cell 50 which has a force imparted thereto by the cross member 48 in response to the weight supported by the pivoted arms 45 and 46 which fluctuates with variations in the weight of material supported in the weigh duct 44. The weigh cell 50 functions as a transmitter for constantly sending a signal proportional to the weight of material it senses in the duct 44. The weigh cell 50 can be any one of several well known devices designed for carrying out this function and it can be either pneumatically, hydraulically or electronically controlled and operated. In a preferred form of the invention, the weigh cell 50 is pneumatically actuated and is a model 502A weight transmitter of the type available from the Kane Air Scale Company of Glassboro, New Jersey.

The signal proportional to the weight supported in the duct 44 is transmitted from the weigh cell 50 to a conventional set point controller 51 which can also be of the pneumatic, hydraulic or electronic type depending upon the type of operation preferred. The set point controller 51 is used to control and vary as necessary the setting of the rod 43 of the positioning cylinder 42. The position of the rod 43 will, of course, control outflow from the heat exchanger 10 by means of the previously described mechanism. That is, the set point controller 51 automatically varies the setting of the piston rod 43 in response to the signal it receives from the weigh cell 50. In this way the controller 51 strives to maintain the weight of granular material substantially constant within the weigh duct 44. This, in turn, is necessary in order to maintain a choked flow condition within the heat exchanger 10.

In a preferred installation, the set point controller 51 was a No. 50 two mode stack controller supplied by the Moore Products Company of Springhouse, Pennsylvania and the positioning cylinder 42 was a series B-50XR actuator of the type manufactured by Conoflow Corporation of Blackwood, New Jersey. These control devices are merely examples of a combination that has been successfully used, it being understood that the invention is not limited to these specific types. As aforesaid, various combinations of pneumatic, hydraulic and/or electronic devices can be used to practice the invention and sense the weight of granules in the weigh duct 44 in order to control outflow from the bottom of the heat exchanger 10 and maintain a choked flow condition therein at all times.

It will also be appreciated that various other types of flow control devices can be utilized in the lower portion of the heat exchanger 10, including but not limiting to feeder valves, feeder belts, variable slots and converging hoppers. In addition, it is also possible to sense the weight of granules in the duct 44 by various means such as optical systems, radiation absorption systems, indicator type systems and the like in order to feed a proportional signal to the set point controller 51.

While particular embodiments of the invention have been illustrated and described, it will be obvious to those skilled in the art that various changes and modifications can be made without departing from the spirit and scope of the invention and it is intended that all such changes and modifications are within the scope of this invention.

We claim:

1. An apparatus for maintaining choked flow in a heat exchanger for granular material comprising:
   a. a weigh duct suspended over and mounted for pivotal movement above said heat exchanger;
   b. weight supporting members mounted in said weigh duct for sensing the weight of granular material reposing in said weigh duct;
   c. a flow control mechanism for varying the outflow of granular material from said heat exchanger;
   d. means for sensing variations in the weight of material reposing in said weigh duct and transmitting a signal proportional thereto; and
   e. means for controlling the outflow through said flow control mechanism in response to the signal from said sensing means.

2. An apparatus for maintaining choked flow in a heat exchanger as claimed in claim 1 wherein the weight supporting members comprise a plurality of bars mounted transversely with respect to the direction of flow through said weigh duct.

3. An apparatus for maintaining choked flow in a heat exchanger as claimed in claim 1 wherein said flow control mechanism comprises a metering plate mounted transversely in the bottom of said heat exchanger, a plurality of orifices in said metering plate, a grid structure mounted beneath said metering plate, a plurality of cone shaped members on said grid structure, said cone shaped members projecting upwardly in alignment with each of said orifices, and means for moving said grid structure to vary the effective opening of said orifices and to control outflow from said heat exchanger.

4. An apparatus for maintaining choked flow in a heat exchanger as claimed in claim 1 wherein said weigh duct is pivoted on a horizontal axis located laterally beyond the side walls of said weigh duct.

5. An apparatus for maintaining choked flow in a heat exchanger as claimed in claim 2 wherein said flow control mechanism comprises a metering plate mounted transversely in the bottom of said heat exchanger, a plurality of orifices in said metering plate, a grid structure mounted beneath said metering plate, a plurality of cone shaped members on said grid structure, said cone shaped members projecting upwardly in alignment with each of said orifices, and means for moving said grid structure to vary the effective opening of said orifices and to control outflow from said heat exchanger.

6. An apparatus for maintaining choked flow in a heat exchanger as claimed in claim 2 wherein said weigh duct is pivoted on a horizontal axis located laterally beyond the side walls of said weigh duct.

7. An apparatus for maintaining choked flow in a heat exchanger as claimed in claim 3 wherein said weigh duct is pivoted on a horizontal axis located laterally beyond the side walls of said weigh duct.

8. An apparatus for maintaining choked flow in a heat exchanger as claimed in claim 1 wherein:
   a. said weigh duct is pivoted on a horizontal axis located laterally beyond the side walls of said weigh duct;
   b. said weight supporting members comprise a plurality of bars mounted transversely with respect to the direction of flow through said weigh duct; and
   c. said flow control mechanism comprises a metering plate mounted transversely in the bottom of said heat exchanger, a plurality of orifices in said metering plate, a grid structure mounted beneath said metering plate, a plurality of cone shaped members on said grid structure, said cone shaped members projecting upwardly in alignment with each of said orifices, and means for moving said grid structure to vary the effective opening of said orifices and to control outflow from said heat exchanger.